United States Patent
Lin

(10) Patent No.: US 10,922,791 B2
(45) Date of Patent: Feb. 16, 2021

(54) IMAGE PROCESSING APPARATUS AND METHOD

(71) Applicant: REALTEK SEMICONDUCTOR CORP., Hsinchu (TW)

(72) Inventor: Ming-Ta Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 134 days.

(21) Appl. No.: 16/282,979

(22) Filed: Feb. 22, 2019

(65) Prior Publication Data

US 2020/0043141 A1 Feb. 6, 2020

(30) Foreign Application Priority Data

Jul. 31, 2018 (TW) .............................. 107126589 A

(51) Int. Cl.
*G06T 5/00* (2006.01)
*G06T 5/50* (2006.01)
*G06T 5/20* (2006.01)
*G06K 9/62* (2006.01)

(52) U.S. Cl.
CPC ............ *G06T 5/002* (2013.01); *G06K 9/6202* (2013.01); *G06T 5/20* (2013.01); *G06T 5/50* (2013.01)

(58) Field of Classification Search
CPC .. G06T 5/002; G06T 5/20; G06T 5/50; G06K 9/6202
See application file for complete search history.

(56) References Cited

U.S. PATENT DOCUMENTS

| 6,061,100 A | 5/2000 | Ward et al. | |
|---|---|---|---|
| 2006/0139494 A1* | 6/2006 | Zhou | H04N 5/144 348/607 |
| 2013/0083246 A1* | 4/2013 | Chen | G06T 5/002 348/620 |
| 2013/0251282 A1* | 9/2013 | Min | G06T 5/50 382/260 |

(Continued)

FOREIGN PATENT DOCUMENTS

| TW | 201025189 A1 | 7/2010 |
|---|---|---|
| TW | 201105115 A1 | 2/2011 |

(Continued)

*Primary Examiner* — Zhitong Chen
(74) *Attorney, Agent, or Firm* — Birch, Stewart, Kolasch & Birch, LLP

(57) ABSTRACT

An image processing method includes: receiving a currently-input image frame and a previously-output image frame; comparing multiple first pixels corresponding to coordinates of the currently-input image frame with multiple second pixels corresponding to coordinates of the previously-output image frame, and obtaining multiple corresponding differences; obtaining multiple dynamic parameter values based on the differences and a dynamic parameter table; obtaining multiple boundary retention values based on the dynamic parameter values and a boundary operator; and obtaining multiple currently-output pixels based on the first pixels, the second pixels, and the boundary retention values. An image processing apparatus performs the image processing method, to increase accuracy of identifying a boundary adjoining a motion region and a non-motion region, and to remove an artifact of the boundary.

11 Claims, 12 Drawing Sheets

(56) References Cited

U.S. PATENT DOCUMENTS

2014/0192267 A1\* 7/2014 Biswas .................... G06T 5/50
348/701

FOREIGN PATENT DOCUMENTS

| TW | 201416062 A | 5/2014 |
| TW | 201601119 A | 1/2016 |
| TW | 201712580 A | 4/2017 |

\* cited by examiner

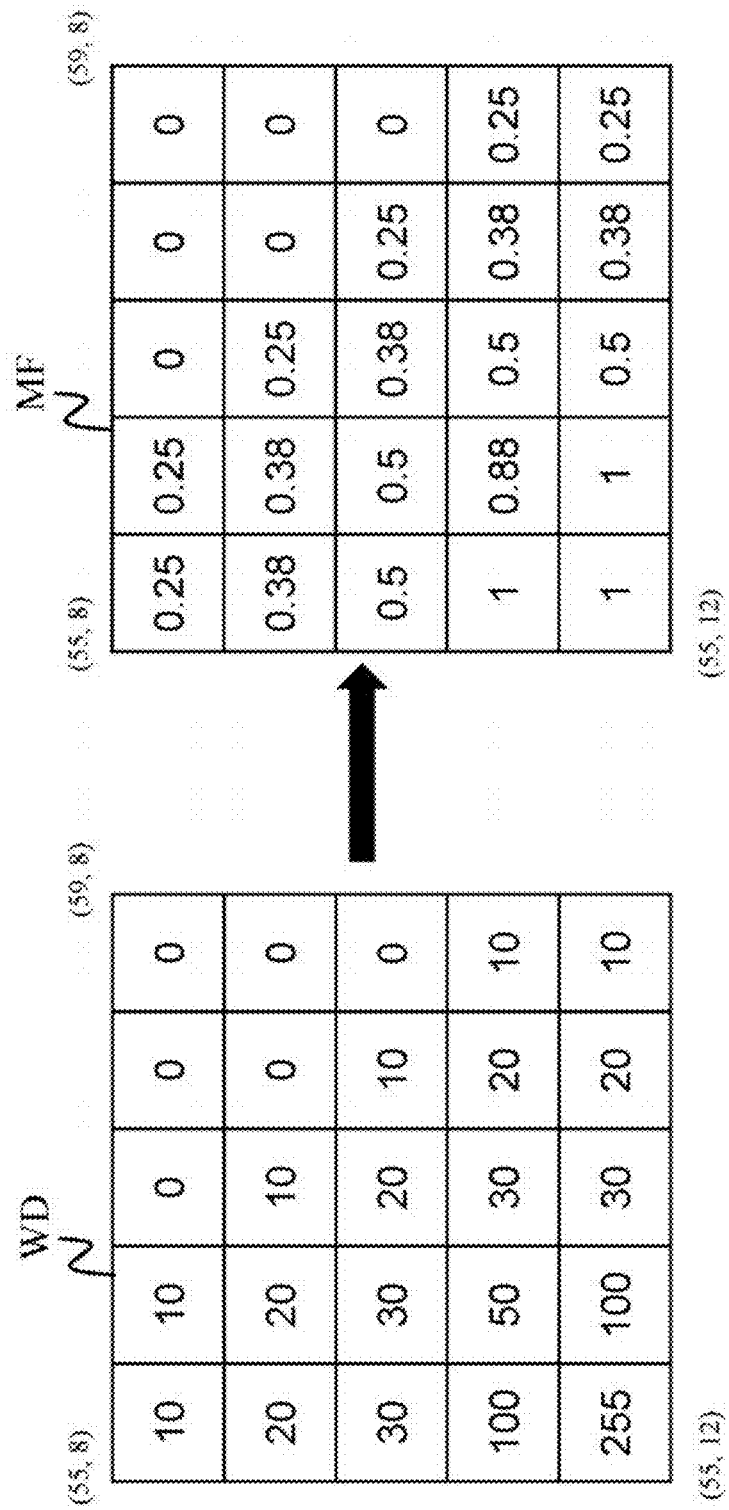

FIG. 7B (60, 7)

| | | | | | | | |
|---|---|---|---|---|---|---|---|
| 0 | 0 | 0 | 0 | 0 | 0 | 0.25 | 0.25 |
| 0 | 0 | 0 | 0 | 0 | 0.25 | 0.25 | 0.25 |
| 0 | 0 | 0 | 0 | 0.25 | 0.38 | 0.38 | 0.5 |
| 0 | 0 | 0 | 0.25 | 0.38 | 0.5 | 0.5 | 1 |
| 0 | 0.25 | 0.38 | 0.5 | 0.88 | 1 | 1 | 1 |
| 0.25 | 0.25 | 0.38 | 0.5 | 1 | 1 | 1 | 1 |
| 0.25 | 0.38 | 0.5 | 1 | 1 | 1 | 1 | 1 |

MF, W labels; (54, 7) top-left of bold box; (54, 13) bottom-left

FIG. 7A (59, 8)

| | | | | |
|---|---|---|---|---|
| 0 | 0 | 0 | 0.25 | 0.25 |
| 0 | 0 | 0.25 | 0.38 | 0.38 |
| 0 | 0.25 | 0.38 | 0.5 | 0.5 |
| 0.25 | 0.38 | 0.5 | 0.88 | 1 |
| 0.38 | 0.5 | 1 | 1 | 1 |
| 0.5 | 1 | 1 | 1 | 1 |

MF, W labels; (55, 8), (55, 12)

FIG. 9A $G_x$

| (59, 8) | | | | |
|---|---|---|---|---|
| 0 | -0.3 | -0.9 | -1.1 | -0.9 |
| -0.3 | -0.9 | -1.3 | -1.1 | -1.5 |
| -0.9 | -1.3 | -1.4 | -1.9 | -2.2 |
| -0.9 | -0.6 | -0.9 | -1.6 | -1.5 |
| -0.63 | -0.87 | -1.24 | -0.74 | -0.12 |

| (59, 8) | | | | |
|---|---|---|---|---|
| 0 | -0.3 | -0.9 | -0.9 | -0.4 |
| -0.3 | -0.9 | -1.3 | -0.6 | -0.7 |
| -0.9 | -1.3 | -1.4 | -0.9 | -1.2 |
| -1.1 | -1.1 | -1.9 | -1.6 | -0.7 |
| -0.9 | -1.4 | -2.2 | -1.5 | -0.1 |

| (59, 8) | | | | |
|---|---|---|---|---|
| 0 | 0.35 | 1.24 | 1.44 | 0.96 |
| 0.35 | 1.24 | 1.78 | 1.29 | 1.67 |
| 1.24 | 1.78 | 1.95 | 2.06 | 2.56 |
| 1.44 | 1.29 | 2.06 | 2.29 | 1.67 |
| 1.09 | 1.62 | 2.56 | 1.673 | 0.17 |

(55, 8) ... (55, 12)

|       | Si    |       |       |       | (59, 8) |
|-------|-------|-------|-------|-------|---------|
| (55, 8) | 0 | 0.35 | 1.24 | 1.69 | 1.21 |
|  | 0.35 | 1.24 | 2.03 | 1.67 | 2.05 |
| MC | 1.24 | 2.03 | 2.33 | 2.56 | 3.06 |
|  | 1.69 | 1.67 | 2.56 | 3.17 | 2.67 |
| 1.34 | 2 | 3.06 | 2.67 | 1.17 | (55, 12) |

FIG. 10A

|       | K    |       |       |       | (59, 8) |
|-------|-------|-------|-------|-------|---------|
| (55, 8) | 0 | 0.11 | 0.39 | 0.53 | 0.38 |
|  | 0.11 | 0.39 | 0.64 | 0.53 | 0.65 |
| MC' | 0.39 | 0.64 | 0.74 | 0.81 | 0.97 |
|  | 0.53 | 0.53 | 0.81 | 1 | 0.84 |
| 0.42 | 0.63 | 0.97 | 0.84 | 0.37 | (55, 12) |

FIG. 10B

IMAGE PROCESSING APPARATUS AND METHOD

CROSS-REFERENCE TO RELATED APPLICATION

This non-provisional application claims priority under 35 U.S.C. § 119(a) to patent Application No. 107126589 in Taiwan, R.O.C. on Jul. 31, 2018, the entire contents of which are hereby incorporated by reference.

BACKGROUND

Technical Field

This application describes an image processing apparatus and method relating to noise reduction.

Related Art

Noise located in an image frame affects details or information in the image frame. For example, when an image frame of a number plate captured by an event data recorder has noise, a central processing unit cannot easily find a position of the number plate in the image frame and cannot easily identify numbers on the number plate. Currently, methods for noise reduction include spatial noise reduction, temporal noise reduction, and 3D noise reduction.

For the spatial noise reduction, a spatial filter, such as an averaging filter, a median filter, a Gaussian filter, a bilateral filter, and a sigma filter, is used to perform smoothing on the noise in the image frame. However, the spatial noise reduction results in blurring of a boundary and the information in the image frame.

For the temporal noise reduction, a temporal recursive filter is used to compare multiple pixels in a current image frame with multiple pixels in a previous image frame, and a pixel region in the current image frame is divided into a motion region and a non-motion region. In the motion region, the temporal recursive filter stops operation, to avoid blurring of the motion region. In the non-motion region, the temporal recursive filter compares the current image frame with the previous image frame based on a timeline, to remove the noise located in the non-motion region.

The 3D noise reduction combines the spatial noise reduction and the temporal noise reduction.

SUMMARY

However, the temporal noise reduction has a technical problem, that is, cannot accurately determine a boundary that is in a current image frame and that adjoins a motion region and a non-motion region. In the temporal noise reduction, a mask or a sampling window is used to compare a pixel difference between a current image frame and a previous image frame, to determine the boundary adjoining the motion region and the non-motion region. If the pixel difference is greater than a preset value, it is determined that a part of the current image frame is the motion region. If the pixel difference is zero, it is determined that a part of the current image frame is the non-motion region. However, when the pixel difference is between the preset value and zero, whether a part of the image frame is the motion region or the non-motion region cannot be identified. Consequently, the boundary adjoining the motion region and the non-motion region has an artifact.

In view of the foregoing problem, according to an embodiment, an image processing method includes: receiving a currently-input image frame and a previously-output image frame, where the currently-input image frame includes multiple first pixels, and the previously-output image frame includes multiple second pixels; comparing the first pixels and the second pixels corresponding to a coordinate system, and obtaining multiple corresponding differences; obtaining multiple dynamic parameter values based on the differences and a dynamic parameter table; obtaining multiple boundary retention values based on the dynamic parameter values and a boundary operator; and obtaining multiple currently-output pixels based on the first pixels, the second pixels, and the boundary retention values. Therefore, a luma value or a chroma value of the boundary adjoining the motion region and the non-motion region may be added in this application, to increase accuracy of identifying the boundary adjoining the motion region and the non-motion region, and to remove the artifact of the boundary.

According to an embodiment, the dynamic parameter table includes multiple difference values and multiple dynamic parameter values corresponding to the difference values; and the step of obtaining the dynamic parameter values is searching for the corresponding difference values based on the differences, and obtaining the corresponding dynamic parameter values.

According to an embodiment, the boundary operator includes a horizontal operator and a vertical operator, and the step of obtaining the boundary retention frame is generating the boundary retention values based on the found dynamic parameter values, the horizontal operator and the vertical operator.

According to an embodiment, in the step of obtaining the currently-output pixels, the currently-output pixels are obtained after an operation is performed on the first pixels, the second pixels, and the boundary retention values based on the following formula (1):

$$O_{i(x,y)} = (1 - K_{(x,y)}) \times O_{i-1(x,y)} + K_{(x,y)} \times I_{i(x,y)} \qquad (1);$$

where $O_{i(x, y)}$ is a currently-output pixel of coordinates (x, y);

$O_{i-1(x, y)}$ is a second pixel (previously-output pixel) of the coordinates (x, y);

$K_{(x, y)}$ is a boundary retention value of the coordinates (x, y); and $I_{i(x, y)}$ is a first pixel (currently-input pixel) of the coordinates (x, y).

According to an embodiment, an image processing apparatus includes a camera module, a storage module, and a processing module. The camera module captures a currently-input image frame, where the currently-input image frame includes multiple first pixels. The storage module stores a previously-output image frame, where the previously-output image frame includes multiple second pixels. The processing module compares the first pixels and the second pixels corresponding a coordinate system, and obtains multiple corresponding differences; obtains multiple dynamic parameter values based on the differences and a dynamic parameter table; obtains multiple boundary retention values based on the dynamic parameter values and a boundary operator; and obtains multiple currently-output pixels based on the first pixels, the second pixels, and the boundary retention values. Therefore, a luma value or a chroma value of the boundary adjoining the motion region and the non-motion region may be added in this embodiment, to increase accuracy of identifying the boundary adjoining the motion region and the non-motion region, and to remove the artifact of the boundary.

According to an embodiment, the image processing apparatus further includes a filter circuit, configured to: remove noise of the currently-input image frame, and generate a current noise reduction image frame, where the processing module receives the current noise reduction image frame and the previously-output image frame before comparison, and the current noise reduction image frame includes the first pixels. Therefore, a luma value or a chroma value of the boundary adjoining the motion region and the non-motion region may be added in this embodiment, to increase accuracy of identifying the boundary adjoining the motion region and the non-motion region, and to remove the artifact of the boundary.

BRIEF DESCRIPTION OF THE DRAWINGS

FIG. 6A and FIG. 6B are schematic diagrams of dynamic parameter frames based on the difference in the window M of FIG. 4 and obtained corresponding dynamic parameter values;

FIG. 7A and FIG. 7B are schematic diagrams of a mask in a dynamic parameter frame MF in FIG. 6B;

FIG. 9A to FIG. 9C show obtained horizontal gradient values, vertical gradient values and total gradient values corresponding to the window M of the dynamic parameter values in the window M in FIG. 6B;

FIGS. 10A and 10B are schematic diagrams of a boundary retention frame corresponding to the window M and a normalized boundary retention frame that are obtained based on the total gradient values of the window M of FIG. 9C;

DETAILED DESCRIPTION

To clearly represent each element, the following terms "first" and "second" are used to distinguish the elements, but are not used to describe a specific sequence or limit a difference between the elements, and are either not used to limit the scope of the present invention.

Figure 1:
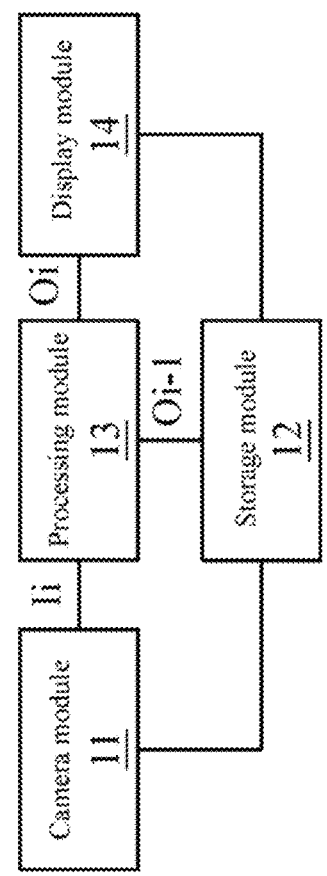
FIG. 1 is a schematic block diagram of a circuit of an embodiment of an image processing apparatus according to this application.

Referring to FIG. 1, FIG. 1 is a schematic block diagram of a circuit of an embodiment of an image processing apparatus according to this application. The image processing apparatus includes a camera module 11, a storage module 12, a processing module 13, and a display module 14.

The image processing apparatus 10 may be a handheld apparatus, or may be a non-handheld apparatus. The handheld apparatus may be, for example, a smartphone, a portable navigation device (PND), an e-book, a notebook computer, or a tablet computer (Tablet or Pad). The non-handheld apparatus may be, for example, a smart appliance, digital signage, or a Multi media Kiosk (MMK).

The camera module 11 receives an optical image signal and converts the signal into image frames. Each image frame includes multiple pixels, and the pixels are, for example, but are not limited to, arranged pixels of a two-dimensional array. In a chronological sequence, each image frame may be referred to as a previously-input image frame and a currently-input image frame Ii (to be described in detail later). The camera module 11 may be an event data recorder, a camera, a video camera, a charged coupled device (CCD), or the like.

The processing module 13 is electrically connected to the camera module 11, the display module 14, and the storage module 12, and is configured to execute a particular computer program product, to implement the image processing method provided in an embodiment of this application. The processing module 13 may be an executable program such as a central processing unit, a microprocessor, or an application-specific integrated circuit (ASIC), and control a surrounding apparatus or a computing apparatus that can communicate with a surrounding apparatus. The surrounding apparatus may be a video camera, an event data recorder, a display, a keyboard, a mouse, a USB, mobile WiFi, or the like. The processing module 13 processes a previously-input image frame Oi-1 and a currently-input image frame Ii that are generated by the camera module 11, and generates an output image frame Oi. The image frames Oi are named in a chronological sequence, and are referred to as a previously-output image frame Oi-1 and a currently-output image frame Oi (to be described in detail later). The storage module 12 is electrically connected to the camera module 11 and the display module 14. In some embodiments, the storage module 12 is configured to store the previously-input image frame, the currently-input image frame Ii, the previously-output image frame Oi-1, and the currently-output image frame Oi. The storage module 12 may be a storage element such as a non-volatile memory or a hard disk. The electrical connection in this application is a connection manner between elements, and may be a wired connection (or a wire connection) or a wireless connection (or a communications connection). The wired connection means that elements are connected by using a wire, so that an electrical signal may be transmitted between or received by elements through the wire. The wireless connection means that elements are connected by using a network, so that an electrical signal may be transmitted between or received by elements through the network.

The display module 14 is electrically connected to the processing module 13 and the storage module 12, and is configured to display the currently-output image frame Oi based on control of the processing module 13. The display module 14 may be a display, such as a display panel of an LCD and an OLED, a touch panel, or a flexible panel.

Figure 2:
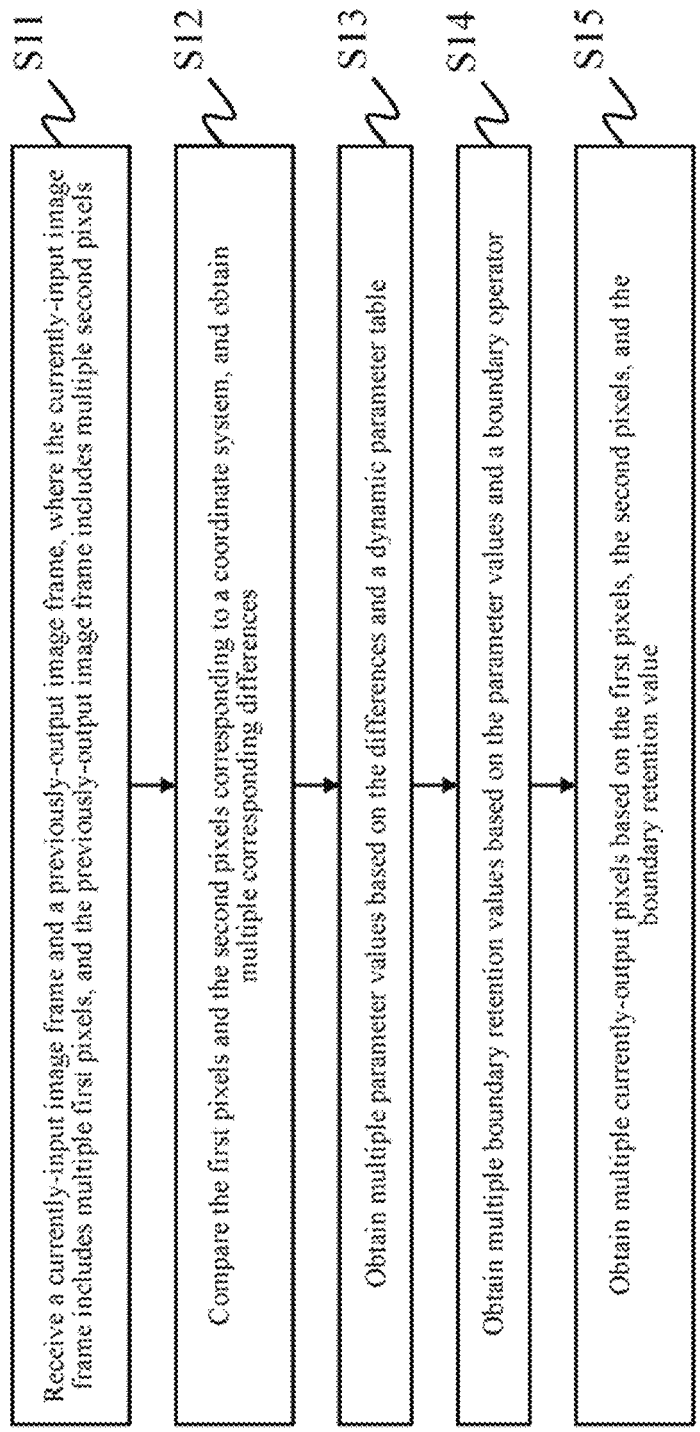
FIG. 2 is a schematic flowchart of an embodiment of an image processing method according to this application.

Referring to FIG. 2, FIG. 2 is a schematic flowchart of an embodiment of an image processing method. The image processing method includes step S11 to step S15. The foregoing step S11 to S15 may be implemented by using a computer program product. The computer program product may be a readable recording medium, and may be executed by the image processing apparatus 10. The readable recording medium stores a program including a plurality of program code, but is not limited thereto. In some embodiments, the program may be transmitted to the image processing apparatus 10 in a wired or wireless manner, and is executed by the image processing apparatus 10.

Figure 3:
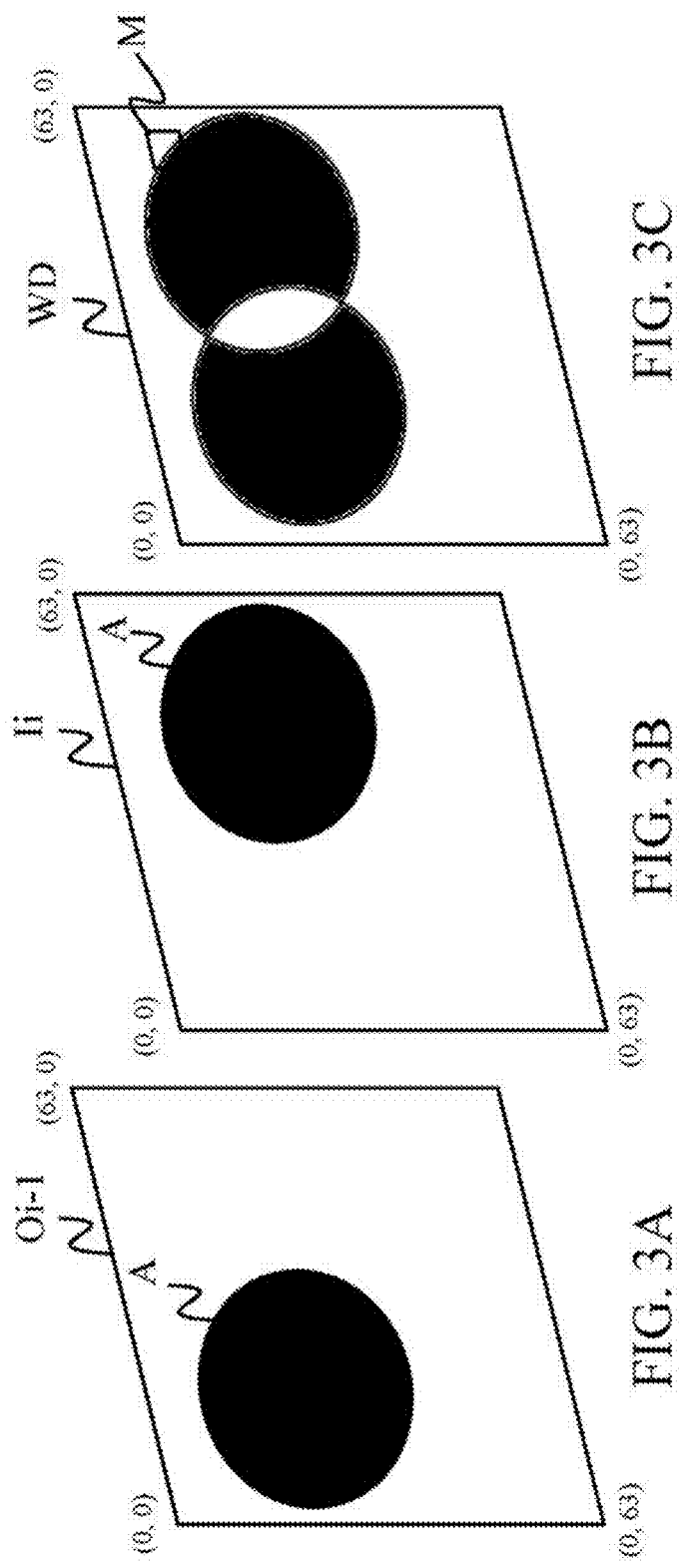
FIG. 3A to FIG. 3C are schematic diagrams of a currently-input image frame, a previously-output image frame, and a corresponding difference frame according to an embodiment of this application.

Referring to FIG. 1 and FIG. 2, step S11 is receiving a currently-input image frame Ii and a previously-output image frame Oi-1. The currently-input image frame Ii includes multiple first pixels, and the previously-output image frame Oi-1 includes multiple second pixels. According to some embodiments, referring to FIG. 2 and FIG. 3A to FIG. 3C together, FIG. 3A to FIG. 3C are schematic diagrams of the currently-input image frame Ii, the previously-output image frame Oi-1, and a corresponding difference frame WD according to an embodiment of this application. The processing module 13 may receive the previously-output image frame Oi-1 from the storage module 12 and receive the currently-input image frame Ii from the camera module 11. In some embodiments, after the camera module 11 captures the currently-input image frame Ii, the storage module 12 stores the currently-input image frame Ii. The processing module 13 may receive the currently-input image frame Ii and the previously-output image frame Oi-1 from the storage module 12.

The currently-input image frame Ii and the previously-output image frame Oi-1 have a same size, and coordinates thereof are corresponding to each other. The currently-input image frame Ii and the previously-output image frame Oi-1 each have a motion region A (for example, a black circle image) and a non-motion region (for example, a white background image). It may be learned from the figured that the motion region A is located on a left side in the previously-output image frame Oi-1, and is located on a right side in the currently-input image frame Ii. A rectangular coordinate system is used as an example. The currently-input image frame Ii includes multiple first pixels, and each first pixel corresponds to coordinates on the rectangular coordinate system, for example, (0, 0), (63, 0), and (0, 63). The previous-input image frame Oi-1 includes multiple second pixels, and each second pixel corresponds to coordinates on the rectangular coordinate system. Further, each second pixel located at coordinates corresponds to a first pixel located at same coordinates.

Referring to FIG. 3A to FIG. 3C again, the currently-input image frame Ii overlaps with the previously-output image frame Oi. Overlapping means that the size of the currently-input image frame Ii is the same as the size of the previously-output image frame Oi-1, and the currently-input image frame Ii and the previously-output image frame Oi-1 each use a top left corner as an origin of coordinates (0,0), and mutually overlap based on the origin.

Step S12: Compare the first pixels and the second pixels corresponding to coordinates, and obtain multiple corresponding differences. The first pixels and the second pixels corresponding to coordinates are first pixels and second pixels located at same coordinates. According to some embodiments, referring to FIG. 3A to FIG. 3C and FIG. 4 together, the difference frame WD has a size the same as the sizes of the currently-input image frame Ii and the previously-output image frame Oi-1, and has corresponding coordinates. Moreover, the processing module 13 calculates the differences between the first pixels and the second pixels corresponding to the coordinates, and uses the differences as a pixel value of each corresponding coordinate in the difference frame WD.

Referring to FIG. 3C again, the differences are absolute values of 'first pixel values corresponding to the coordinates minus second pixel values'. For example, the previously-output image frame Oi-1 and the currently-input image frame Ii intersect in a region (that is, a leaf-shaped region). It is assumed that a pixel value of the motion region A in the previously-output image frame Oi-1 and the currently-input image frame Ii is 255. When the motion region A located in the previously-output image frame Oi-1 and the motion region A located in the currently-input image frame Ii partially intersect, differences 0 are obtained by subtracting pixel values of the currently-input image frame Ii in the intersection region from pixel values of the previously-output image frame Oi-1 in the intersection region. Other differences in the difference frame WD are deduced in this way, to obtain the differences between current pixel values and previous pixel values in the difference frame WD.

Figure 4:
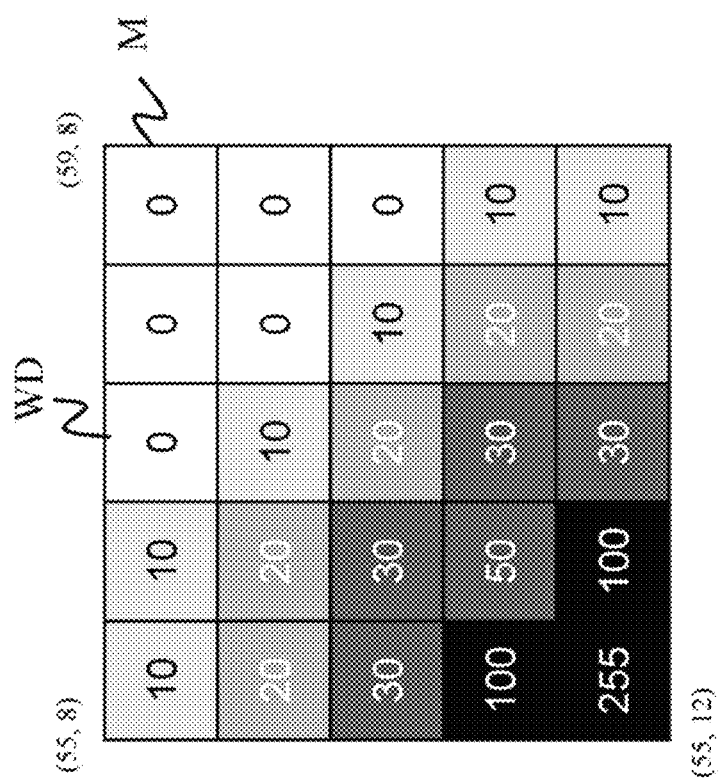
FIG. 4 is a schematic diagram of a difference of a window M in FIG. 3C.

Referring to FIG. 3C and FIG. 4, FIG. 4 is a schematic diagram of the differences of a window M in FIG. 3C. A sampling window M (referred to as 'window M' below) is a small-region window at a top right corner of the difference frame WD in FIG. 3C. The window M covers a part of a boundary of the motion region A in the difference frame WD. In FIG. 4, a number in each grid of the window M is a corresponding difference of the grid. The window M includes 5×5 pixels, and each pixel has a difference. In this embodiment, for example, if each pixel has eight bits, the differences may be between 0 and 255. When the difference is 0, it indicates that values of the first pixel and the second pixel corresponding to the difference are the same. That is, the first pixel and the second pixel may be probably in the motion region A or in the non-motion region at the same time. When the difference is 255, it indicates that a pixel value of the first pixel corresponding to the difference significantly changes. FIG. 4 is used as an example. FIG. 4 shows the differences corresponding to pixels in the window M at the top right corner of the motion region A in the difference frame WD of FIG. 3C. It may be learned from the figure that a difference of coordinates (59, 8) on the top right corner of the window M is 0, it indicates that the first and second pixel values of the coordinates are the same. However, a difference of coordinates (55, 12) at a lower left corner of the window M is 255, it indicates that the first and second pixel values of the coordinates have a significant difference, and a region between the first and second pixel values is a part of the boundary of the motion region. A wider region usually indicates a more indistinct image.

It should be particularly noted that pixel values (that is, the differences) in the difference frame WD in FIG. 4 are represented by using grayscale. In detail, a pixel value 0 in the difference frame WD is represented by using white, and a pixel value 255 in the difference frame WD is represented by using black. A higher pixel value indicates a higher grayscale. Such representation is only for convenience of distinguishing values of numbers, and is not related to the scope of this embodiment.

Figure 5:
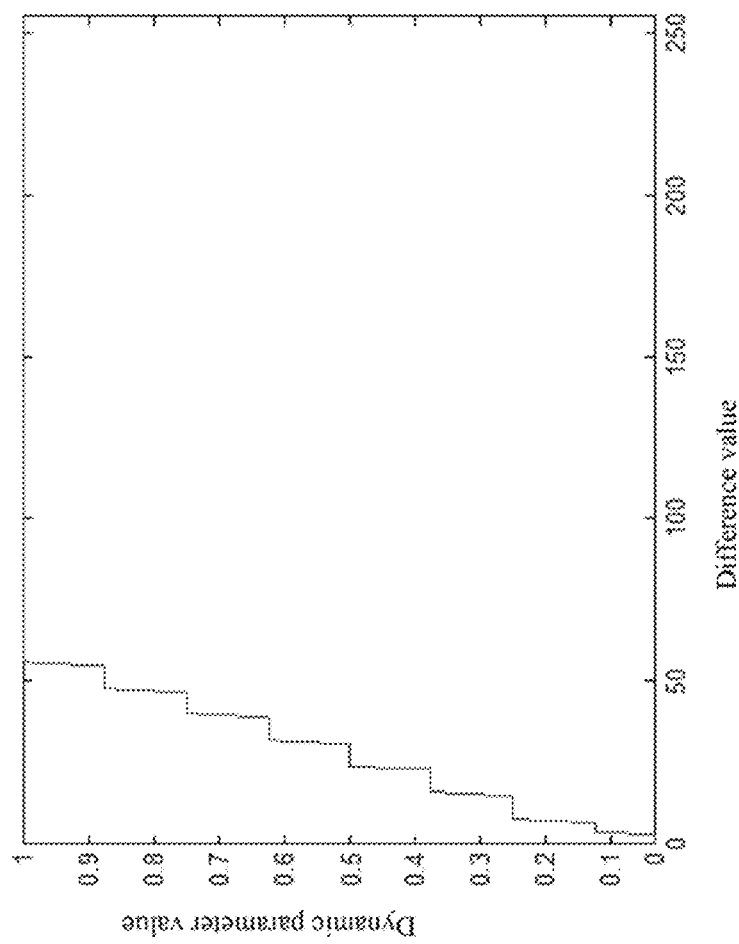
FIG. 5 is a schematic diagram of a relationship between dynamic parameter values and difference values according to an embodiment of this application.

Step S13 is obtaining multiple dynamic parameter values based on the differences and a dynamic parameter table. Referring to FIG. 5, FIG. 6A, and FIG. 6B together, FIG. 5 is a schematic diagram of a relationship between the dynamic parameter values and difference values, a lateral axis is the difference values, and a longitudinal axis is the dynamic parameter values. In this embodiment, a curve in the dynamic parameter table is a step curve, and each point on the step curve corresponds to a difference value and a dynamic parameter value. The processing module 13 finds a corresponding difference value and a dynamic parameter value corresponding to the difference value from the dynamic parameter table based on a difference of each pixel in the difference frame WD, and converts the difference frame WD into a dynamic parameter frame MF (dynamic parameter values corresponding to the window M of FIG. 6B) having a same size. The dynamic parameter frame MF includes multiple found dynamic parameter values. The found dynamic parameter values correspond to the differences in the difference frame WD. For example, FIG. 6A is the differences corresponding to the window M in the difference frame WD, and FIG. 6B is dynamic parameter values converted from the pixels in the window M. In the currently-input image frame Ii corresponding to the window M, a difference of coordinates (55, 8) is 10. After the dynamic parameter table of FIG. 5 is searched, in the dynamic parameter frame MF corresponding to the window M, a dynamic parameter value of the coordinates (55, 8) is 0.25. Similarly, in the currently-input image frame Ii corresponding to the window M, a difference of coordinates (55, 12) is 255. In the dynamic parameter frame MF corresponding to the window M, a dynamic parameter value of the coordinates (55, 12) is 1. Other differences and dynamic parameter values at same coordinates are deduced in this way, and details are not described again.

In some embodiments, in addition to being a step curve, a curve distributed in the dynamic parameter table may alternatively be a parabolic curve, a slash, a fold line, a straight line, or a curve of any other shape.

Step S14 is obtaining multiple boundary retention values based on the dynamic parameter values and a boundary operator. A normalized boundary retention value is used as an example. The boundary operator is a Sobel operator. The boundary operator includes a horizontal operator Mx and a vertical operator My, and is described below.

In some embodiments, the horizontal operator Mx is $$\begin{pmatrix} -1 & 0 & 1 \\ -2 & 0 & 2 \\ -1 & 0 & 1 \end{pmatrix},$$

and the vertical operator My is $$\begin{pmatrix} 1 & 2 & 1 \\ 0 & 0 & 0 \\ -1 & -2 & -1 \end{pmatrix}.$$

The Sobel operator is used as an example. It is assumed that the size of the dynamic parameter frame MF is the same as the sizes of the difference frame, the previously-output image frame Oi-1, and the currently-input image frame Ii. A convolution operation is performed on the pixels in the dynamic parameter frame MF of FIG. 6B by using the horizontal operator Mx and the vertical operator My respectively, to obtain a horizontal gradient value Gx and a vertical gradient value Gy of each pixel at the coordinates. This is described below.

The horizontal gradient value Gx is $$\begin{pmatrix} -1 & 0 & 1 \\ -2 & 0 & 2 \\ -1 & 0 & 1 \end{pmatrix} \times MF,$$

and the vertical gradient value Gy is $$\begin{pmatrix} 1 & 2 & 1 \\ 0 & 0 & 0 \\ -1 & -2 & -1 \end{pmatrix} \times MF.$$

Figure 8:
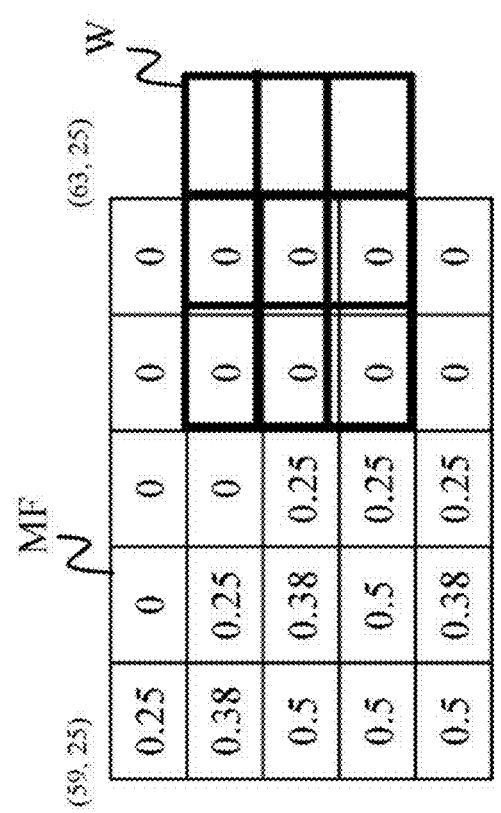
FIG. 8 is a schematic diagram of a mask beyond a boundary of a dynamic parameter frame MF in FIG. 6B.

To describe a method for obtaining the horizontal gradient value Gx, the vertical gradient value Gy, and a total gradient value G, refer to FIG. 7A to FIG. 9C. FIG. 7A and FIG. 7B are schematic diagrams of a mask W in the dynamic parameter frame MF of FIG. 6B. FIG. 8 is a schematic diagram of dynamic parameter values of a pixel on an external side of the mask W beyond a boundary of the dynamic parameter frame MF in FIG. 6B. According to the foregoing operation manners of the horizontal gradient value Gx and the vertical gradient value Gy, after operation, a horizontal gradient value Gx, a vertical gradient value Gy, and a total gradient value G that correspond to the window M, that are obtained based on the dynamic parameter values in the window M of FIG. 6B, and that are shown in FIG. 9A to FIG. 9C are obtained.

Referring to FIG. 7A and FIG. 7B, a mask W having a size the same as those of the boundary operators Mx and My is set. For example, if the size of the mask W is 3×3, that is, a number in each grid of the mask W corresponds to a dynamic parameter value in the dynamic parameter frame MF. Next, the mask W is located in the dynamic parameter frame MF. A number in a central grid of the mask W corresponds to a dynamic parameter value which is intended to be used to obtain the horizontal gradient value Gx or the vertical gradient value Gy. That is, the dynamic parameter value located in the central grid of the mask W is a target pixel, and other grids adjacent to the central grid are adjoining pixels. For example, in FIG. 7A, the central grid of the mask W is located at 0.38 of coordinates (57, 10). After a convolution operation is performed by using the boundary operators Mx and My, the horizontal gradient value Gx or the vertical gradient value Gy located at the same coordinates may be obtained. In FIG. 7B, the central grid of the mask W is located at 0.25 of coordinates (55, 8), the horizontal gradient value Gx or the vertical gradient value Gy corresponding to the coordinates may be obtained. The horizontal gradient values Gx or vertical gradient values Gy of the other coordinates are deduced in this way, and details are not described.

According to some embodiments, referring to FIG. 8, FIG. 8 shows a dynamic parameter frame of coordinates ranging from (59, 25) to (63, 59) in FIG. 3C. When the horizontal gradient value Gx and/or the vertical gradient value Gy of a pixel at coordinates (63, 27) are/is calculated, a central position of the mask W is located at coordinates (63, 27). A right column of the mask W falls outside the dynamic parameter frame MF of FIG. 3C, that is, beyond a boundary of the dynamic parameter frame MF. The right column of the mask W corresponds to one or more empty grids. The empty grids may have the following implementations: The empty grids are set to 0; the empty grids are not calculated; dynamic parameter values that adjoin the empty grids and that are in the mask W are mirrored to the empty grids (in this example, dynamic parameter values (0, 0, 0) that are in the mask W and that adjoin the empty grids in the right column are copied to the empty grids in the right column); linear interpolation is performed, and the like.

Subsequently, referring to FIG. 9A to FIG. 9C, a convolution operation is performed on the dynamic parameter values corresponding to the mask W by using the horizontal operator Mx and the vertical gradient value My respectively, to obtain a horizontal gradient value Gx and a vertical gradient value Gy of each target pixel in the dynamic parameter frame MF. Next, the horizontal gradient value Gx and the vertical gradient value Gy are calculated in a combined manner to obtain a total gradient value G of each target pixel in the dynamic parameter frame MF, that is, the total gradient value $G=\sqrt{Gx^2+Gy^2}$. That is, in the dynamic parameter frame MF corresponding to the window M, a dynamic parameter value (or referred to as a target pixel) of each coordinate has the total gradient value G, shown in FIG. 9C. For example, in FIG. 9C, the total gradient value G of the coordinates (55, 8) is 1.09, the total gradient value G of the coordinates (55, 12) is 0.17, and the total gradient value G of the coordinates (59, 8) is 0. The total gradient values G of the other coordinates are deduced in this way, and details are not described again.

To describe the total gradient value G of each pixel plus the dynamic parameter value of the pixel, and normalize an obtained value, to obtain multiple normalized boundary retention values K between 0 and 1, where the normalized boundary retention values K correspond to the boundary retention values of the window M, refer to FIG. 10A and FIG. 10B. FIG. 10A and FIG. 10B are schematic diagrams of a boundary retention frame MC corresponding to the window M and a normalized boundary retention frame MC' that are obtained based on the total gradient values G of FIG. 9C.

The foregoing normalization means that a sum (a boundary retention sum Si for short below) of the total gradient value G and the dynamic parameter value of each pixel position is normalized, to make the sum between 0 and 1. The normalization has several different implementations. In some embodiments, a range from a maximum (Smax) to a minimum (Smin) of the boundary retention sum corresponding to each pixel of the dynamic parameter frame MF is normalized to a range from 1 to 0. In some embodiments, a range from a maximum (Smax) to 0 of the boundary retention sum corresponding to each pixel of the dynamic parameter frame MF is normalized to a range from 1 to 0. That is, a normalized boundary retention value K of a pixel is equivalent to the boundary retention sum Si of the pixel divided by the maximum (K=Si/Smax).

Referring to FIG. 10A again, in the dynamic parameter frame MF corresponding to the window M, the dynamic parameter value (or referred to as a target pixel) of each pixel is added to the corresponding total gradient value G, to obtain multiple boundary retention sums Si. The boundary retention frame MC includes the boundary retention sums Si, and the size of the boundary retention frame MC is the same as the sizes of the dynamic parameter frame MF, the difference frame WD, the previously-output image frame Oi-1, and the currently-input image frame Ii. For example, in FIG. 10A, the boundary retention sums Si of the coordinates (55, 8), (55, 12), and (59, 8) are 1.34, 1.17, and 0. The boundary retention sums Si of the other coordinates are deduced in this way, and details are not described again.

Referring to FIG. 10A and FIG. 10B together, it is assumed that the maximum (Smax) of the boundary retention sum Si in FIG. 10A is 3.17 of the coordinates (56, 11), and the minimum (Smin) of the boundary retention sum Si is 0 of the coordinates (59, 8). Next, each boundary retention sum Si in the boundary retention frame MC of FIG. 10A is divided by 3.17 of the coordinates (56,11), to obtain each normalized boundary retention K at same coordinates in the normalized boundary retention frame MC' of FIG. 10B.

Referring to FIG. 10B, FIG. B shows the normalized boundary retention frame MC' obtained by normalizing the boundary retention frame MC of FIG. 10A. In FIG. 10A, the boundary retention sum Si of the coordinates (55, 8) is 1.34, and the normalized boundary retention value K corresponding to the same coordinates in FIG. 10B is 0.42. In FIG. 10A, the boundary retention sum Si of the coordinates (55, 12) is 1.17, and the normalized boundary retention value K corresponding to the same coordinates in FIG. 10B is 0.37. In FIG. 10A, the boundary retention sum Si of the coordinates (59, 8) is 0, and the normalized boundary retention value K corresponding to the same coordinates in FIG. 10B is 0. The boundary retention values K at other coordinates are deduced in this way, and details are not described again.

Normalization of the boundary retention values K is to normalize a boundary retention sum Si at each coordinate, to improve the identity of a boundary of the motion region A. That is, when the dynamic parameter frame MF is used to identify the boundary of the motion region A, it is difficult to identify the boundary. Consequently, the boundary has an artifact (or the boundary is not clear). However, each normalized boundary retention value K at each coordinate in the normalized boundary retention frame MC' includes the total gradient value G located at the same coordinates, so that situations in which the boundary of the motion region A has the artifact are significantly reduced (or the boundary is more easily identified). By comparing FIG. 10B with FIG. 6B, the normalized boundary retention values corresponding to the boundary of the motion region A are all greater than or equal to the corresponding dynamic parameter values, the identity of the boundary of the motion region A may be improved.

Referring to FIG. 10B again, during normalization of each column, each row, or each diagonal of the normalized boundary retention frame MC', if a normalized retention value K of coordinates is closer to the maximum, the coordinates is more easily identified as the boundary of the motion region A, and if normalized retention values K of other coordinates adjacent to the coordinates are closer to the minimum, the coordinates are more easily identified as not the boundary of the motion region A. For example, it is learned from the boundary retention values K of FIG. 10B that the boundary retention values greater than 0.5 are arranged along a diagonal from the top left corer (55,8) to the lower right corner (59, 12), but the top right corner (59,8) and the lower left corner (55,12) are relatively distant from the boundary. In this way, it may be learned that a position of the boundary can be better determined by using the method in this application.

In some embodiments, the boundary operator may alternatively be a Prewitt operator or a Roberts cross operator.

Step S15 is obtaining multiple currently-output pixels based on the first pixels, the second pixels, and the boundary retention values. The normalized boundary retention values K are used as an example. The currently-input image frame Ii matches the previously-output image frame Oi-1 and the normalized boundary retention values K. The processing module 13 may obtain the currently-output image frame Oi. The currently-output image frame Oi includes multiple currently-output pixels, and each of the currently-output pixel is located at coordinates (x, y) of the coordinate system. The size of the currently-output image frame Oi is the same as the sizes of the boundary retention frame MC, the dynamic parameter frame MF, the difference frame WD, the previously-output image frame Oi-1, and the currently-input image frame Ii. For example, a formula for calculating the currently-output image frame Oi by the processing module 13 is:

$$O_{i(x,y)}=(1-K_{(x,y)})\times O_{i-1(x,y)}+K_{(x,y)}\times I_{i(x,y)} \quad (1);$$

where $O_{i(x, y)}$ is a currently-output pixel of coordinates (x, y);

$O_{i-1(x, y)}$ is a second pixel (previously-output pixel) of the coordinates (x, y);

$K_{(x, y)}$ is a boundary retention value of the coordinates (x, y); and $I_{i(x, y)}$ is a first pixel (currently-input pixel) of the coordinates (x, y).

It may be learned from the foregoing algorithm that when a normalized boundary retention value $K_{(x, y)}$ of the coordinates (x, y) is closer to 1, more pixel values of the first pixels of the currently-input image frame Ii are retained. That is, when an object outline (the boundary of the motion region A) is correspondingly moved, relatively many pixel values of the currently-input image frame Ii are retained. Conversely, when a normalized boundary retention value $K_{(x, y)}$ of the coordinates (x, y) is closer to 0, it indicates that pixel values of the currently-input image frame Ii are close to those of the previously-output image frame Oi-1, and more pixel values of the previously-output image frame Oi-1 are retained.

Next, an embodiment of implementing the image processing method by using the image processing apparatus 10 is described with reference to FIG. 1. In some embodiments, after the camera module 11 captures the currently-input image frame Ii, the storage module 12 stores the currently-input image frame Ii. When image processing starts, that is, when the camera module 11 captures the first currently-input image frame Ii, because there is no previous image frame, the processing module 13 uses the currently-input image frame Ii as a currently-output image frame Oi, and directly controls the display module 14 to display the currently-output image frame Oi. The storage module 12 also stores the currently-output image frame Oi.

At a next time point, the foregoing input image frame Ii and the output image frame Oi become a previous-input image frame Ii-1 and a previously-output image frame Oi-1, and the camera module 11 captures the input image frame, which is referred to as a currently-input image frame Ii. Both the previously-output image frame Oi-1 and the currently-input image frame Ii are stored in the storage module 12.

The processing module 13 immediately generates a currently-output image frame Oi based on the foregoing image processing method and based on the previously-output image frame Oi-1 and the currently-input image frame Ii, stores the currently-output image frame Oi in the storage module 12, and controls the display module 14 to display the currently-output image frame Oi.

In some embodiments, when the storage module 12 does not store the previously-output image frame Oi-1, the processing module 13 may receive the currently-input image frame Ii from the camera module 11, and output the currently-input image frame Ii without performing step S11 to step S15. The storage module 12 stores the currently-input image frame Ii.

In some embodiments, the camera module 11 includes a memory unit (not shown), and the memory unit stores the currently-input image frame Ii. The processing module 13 may receive the currently-input image frame Ii from the memory unit and receive the previously-output image frame Oi-1 from the storage module 12. The memory unit may be the foregoing storage module 12, and details are not described again.

In some embodiments, the storage module 12 is coupled to the camera module 11 in a communication manner supporting the camera module 11, that is, transmits video content to the processing module 13 in a wired communication manner or in a wireless communication manner. The wired communication manner may be, for example, an Ethernet network, a universal serial bus (USB), a high definition multimedia interface (HDMI), or a Mobile High-Definition Link (MHL). The wireless communication manner may be, for example, a wireless network or a mobile communications technology.

Figure 11:
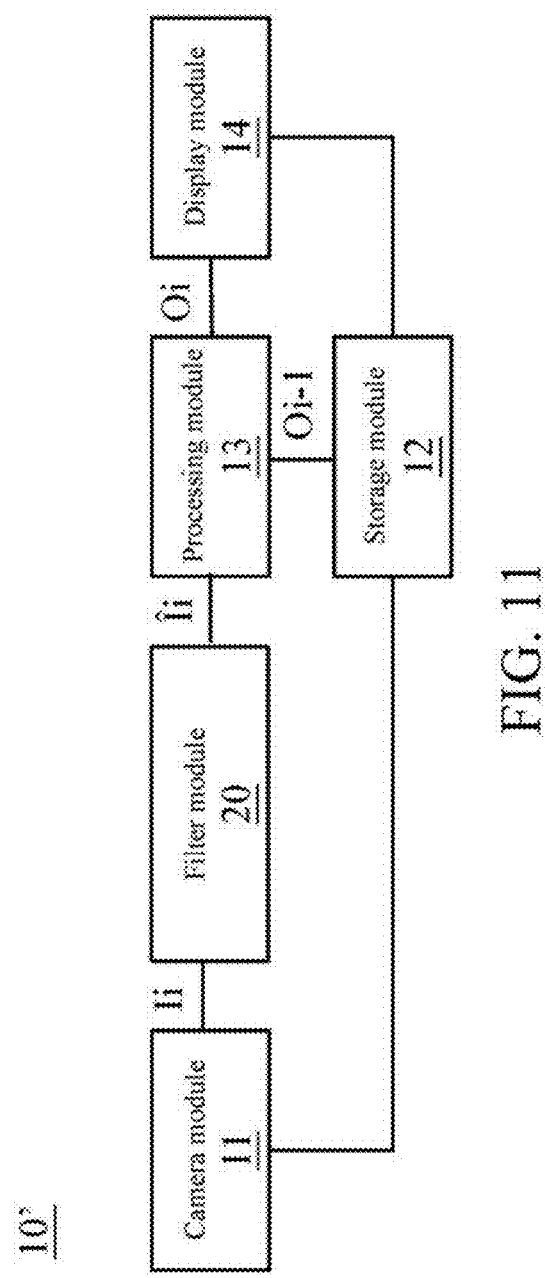
FIG. 11 is a schematic structural diagram of another embodiment of an image processing apparatus according to this application.

Referring to FIG. 11, according to some embodiments, an image processing apparatus 10' includes a camera module 11, a storage module 12, a processing module 13, a filter circuit 20, and a display module. The filter circuit 20 is electrically connected to the camera module 11 and the processing module 13.

The filter circuit 20 may be a low-pass filter, a spatial filter, or the like, and is configured to perform an algorithm, spatial noise reduction. After noise in the currently-input image frame Ii is smoothed, a current image frame $\hat{I}i$ (referred to as 'a current noise reduction image frame $\hat{I}i$' below) with noise reduction is output.

Figure 12:
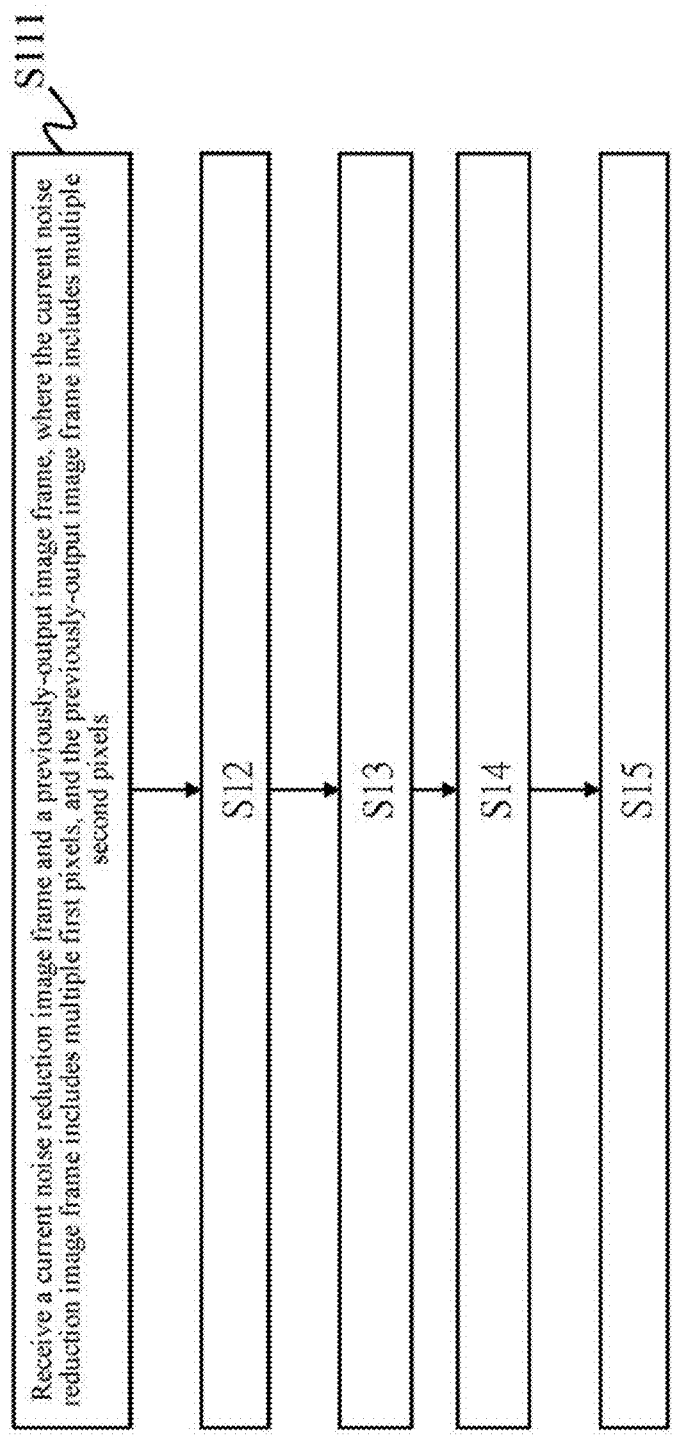
FIG. 12 is a schematic flowchart of another embodiment of an image processing method according to this application.

Referring to FIG. 12, FIG. 12 shows an image processing method according to another embodiment of this application. The image processing method includes steps S111, S12, S13, S14, and S15. When the processing module 13 performs step S111, the processing module 13 receives a current noise reduction image frame $\hat{I}i$ and a previously-input image frame Oi-1. The current noise reduction image frame $\hat{I}i$ includes multiple first pixels, and the previously-input image frame Oi-1 includes multiple second pixels, shown in step S111. Next, step S12 to step S15 in the foregoing image processing method are performed.

In step S15, the processing module 13 performs an operation by using the following formula (2) based on the first pixels, the second pixels, and normalized boundary retention values K, to generate a currently-output image frame Oi.

$$O_{i(x,y)}=(1-K_{(x,y)})\times O_{i-1(x,y)}+K_{(x,y)}\times \hat{I}_{i(x,y)} \quad (2),$$

where $\hat{I}_{i(x, y)}$ is a first pixel (the current noise reduction image frame $\hat{I}i$) of coordinates (x, y). For other symbols, refer to the formula of the currently-output image frame Oi described in the first embodiment, and details are not described again.

In conclusion, according to multiple embodiments of this application, after the image processing method is performed, a luma value or a chroma value of the boundary adjoining the motion region and the non-motion region may be added, to increase accuracy of identifying the boundary adjoining the motion region and the non-motion region, and to remove the artifact of the boundary.

What is claimed is:

1. An image processing method, comprising:
   receiving a currently-input image frame and a previously-output image frame, wherein the currently-input image frame comprises multiple first pixels, and the previously-output image frame comprises multiple second pixels;
   comparing the first pixels and the second pixels corresponding to a coordinate system, and obtaining multiple corresponding differences;
   obtaining multiple dynamic parameter values based on the differences and a dynamic parameter table;

obtaining multiple boundary retention values based on the dynamic parameter values and a boundary operator; and obtaining multiple currently-output pixels based on the first pixels, the second pixels, and the boundary retention values.

2. The image processing method according to claim 1, wherein the dynamic parameter table comprises multiple difference values and multiple dynamic parameter values corresponding to the difference values, and the step of obtaining the dynamic parameter values is searching for the corresponding difference values based on the differences, and obtaining the corresponding dynamic parameter values.

3. The image processing method according to claim 2, wherein the boundary operator comprises a horizontal operator and a vertical operator, and the step of obtaining the boundary retention values is generating the boundary retention values based on the found dynamic parameter values, the horizontal operator and the vertical operator.

4. The image processing method according to claim 3, wherein in the step of obtaining the currently-output pixels, the currently-output pixels are obtained after an operation is performed based on the following formula (1):

$$O_{i(x,y)} = (1-K_{(x,y)}) \times O_{i-1(x,y)} + K_{(x,y)} \times I_{i(x,y)} \qquad (1);$$

where $O_{i(x, y)}$ is a currently-output pixel of coordinates (x, y);

$O_{i-1(x, y)}$ is a second pixel (previously-output pixel) of the coordinates (x, y);

$K_{(x, y)}$ is a boundary retention value of the coordinates (x, y); and $I_{i(x, y)}$ is a first pixel (currently-input pixel) of the coordinates (x, y).

5. An image processing apparatus, comprising:

a storage module, storing a previously-output image frame, wherein the previously-output image frame comprises multiple second pixels;

a camera module, capturing a currently-input image frame, wherein the currently-input image frame comprises multiple first pixels; and a processing module, comparing the first pixels and the second pixels corresponding a coordinate system, and obtaining multiple differences corresponding to the first pixels and the second pixels; obtaining multiple dynamic parameter values based on the differences and a dynamic parameter table; obtaining multiple boundary retention values based on the dynamic parameter values and a boundary operator; and obtaining multiple currently-output pixels based on the first pixels, the second pixels, and the boundary retention values.

6. The image processing apparatus according to claim 5, further comprising a display module, configured to display the currently-output pixels.

7. The image processing apparatus according to claim 5, wherein the processing module comprises performing operations on the first pixels, the second pixels, and the boundary retention values based on the following formula (1) and generating the currently-output pixels:

$$O_{i(x,y)} = (1-K_{(x,y)}) \times O_{i-1(x,y)} + K_{(x,y)} \times I_{i(x,y)} \qquad (1);$$

where $O_{i(x, y)}$ is a currently-output pixel of coordinates (x, y);

$O_{i-1(x, y)}$ is a second pixel (previously-output pixel) of the coordinates (x, y);

$K_{(x, y)}$ is a boundary retention value of the coordinates (x, y); and $I_{i(x, y)}$ is a first pixel (currently-input pixel) of the coordinates (x, y).

8. The image processing apparatus according to claim 5, wherein the dynamic parameter table comprises multiple difference values and multiple dynamic parameter values corresponding to the difference values; and the processing module searches for the corresponding difference values based on the differences, and obtains the corresponding dynamic parameter values.

9. The image processing apparatus according to claim 8, wherein the boundary operator comprises a horizontal operator and a vertical operator; and the processing module generates the boundary retention values based on the found dynamic parameter values, the horizontal operator, and the vertical operator.

10. The image processing apparatus according to claim 5, further comprising a filter circuit, configured to: remove noise of the currently-input image frame, and generate a current noise reduction image frame, wherein the processing module receives the current noise reduction image frame and the previously-output image frame before comparison, and the current noise reduction image frame comprises the first pixels.

11. The image processing apparatus according to claim 10, wherein the processing module comprises performing operations on the first pixels, the second pixels, and the boundary retention values based on the following formula (2) and generating the currently-output pixels:

$$O_{i(x,y)} = (1-K_{(x,y)}) \times O_{i-1(x,y)} + K(x,y) \times \hat{I}_{(x,y)} \qquad (2);$$

wherein $O_{i(x, y)}$ is a currently-output pixel of coordinates (x, y);

$O_{i-1(x, y)}$ is a second pixel of the coordinates (x, y);

$K_{(x, y)}$ is a boundary retention value of the coordinates (x, y); and $\hat{I}_{i(x, y)}$ is a first pixel of the coordinates (x, y).

* * * * *